US012621418B2

(12) United States Patent
Pernías Pascual de Pobil et al.

(10) Patent No.: US 12,621,418 B2
(45) Date of Patent: May 5, 2026

(54) COLOR SPACE MAPPING

(71) Applicant: DISNEY ENTERPRISES, INC., Burbank, CA (US)

(72) Inventors: Pablo Pernías Pascual de Pobil, San Juan de Alicante (ES); Santiago Iglesias Navarro, Palma de Mallorca (ES); Robert B. Moore, Clermont, FL (US); David N. Juboor, Johnson City, TN (US)

(73) Assignee: DISNEY ENTERPRISES, INC.

( * ) Notice: Subject to any disclaimer, the term of this patent is extended or adjusted under 35 U.S.C. 154(b) by 168 days.

(21) Appl. No.: 18/435,753

(22) Filed: Feb. 7, 2024

(65) Prior Publication Data

US 2025/0254279 A1 Aug. 7, 2025

(51) Int. Cl.
*H04N 9/67* (2023.01)
*G06T 7/90* (2017.01)
(Continued)

(52) U.S. Cl.
CPC ................. *H04N 9/67* (2013.01); *G06T 7/90* (2017.01); *G06T 11/10* (2026.01); *G06T 2207/10024* (2013.01); *G06T 2207/20081* (2013.01)

(58) Field of Classification Search
CPC ....... G06T 7/90; G06T 7/0012; G06T 11/001; G06T 2207/10024; G06T 2207/20081; G06T 2207/10056; G06T 2207/30024; G06T 2200/24; G06T 7/001; G06T 2207/30141; B44D 3/003; G06V 20/695; G06V 10/56; G06V 10/255; G06V 20/66; G06N 15/1433; G06N 21/31; G06N 2015/1472; G06F 16/5838; G06F 16/54;
(Continued)

(56) References Cited

U.S. PATENT DOCUMENTS 8,290,275 B2 * 10/2012 Sai .......................... G01J 3/504
356/402
2004/0228526 A9 * 11/2004 Lin ...................... G06V 10/255
382/165

(Continued)

FOREIGN PATENT DOCUMENTS

CN 115244149 A * 10/2022 ................ G01J 3/46
WO WO-9966430 A1 * 12/1999 ............. B44D 3/003

*Primary Examiner* — Wesner Sajous
(74) *Attorney, Agent, or Firm* — Dorsey & Whitney LLP

(57) ABSTRACT

Systems and methods for color space mapping are disclosed. First image data is received comprising first color information in a first color space, which can be a pixel-based color space. Second image data is generated based on the first image data, comprising converted second color information in a second color space based on the first color information. The second color space can be a pigment-based color space. The second image data is modified in the second color space using at least the converted second color information. Supplemental color data is generated based on the modified second image data. A modified image is generated in the first color space using the modified second image data and the generated supplemental color data, the modified image comprising modified color information in the first color space based at least in part on the supplemental color data. The second image data and the supplemental color data are generated using machine learning.

17 Claims, 4 Drawing Sheets

(51) Int. Cl.
*G06T 11/10* (2026.01)
*G06V 10/56* (2022.01)
*G09G 5/02* (2006.01)
*G09G 5/10* (2006.01)
*H04N 1/60* (2006.01)
*H04N 5/57* (2006.01)

(58) Field of Classification Search
CPC .............. G06F 18/256; H04N 9/64–78; H04N 1/58–60; H04N 1/6058; H04N 1/6019–6027; H04N 5/202; H04N 5/445; H04N 5/57–58; H04N 5/78; G09G 5/02; G09G 5/06; G09G 5/10; G09G 3/2003; G09G 3/3607; G09G 2320/028; G09G 2320/06; G09G 2320/066; G09G 2320/02; G09G 2320/0242; G09G 2320/0285; G09G 2320/0271; G09G 2320/0276; G09G 2320/0666; G09G 2320/0247; G09G 2320/0252; G09G 5/30; G09G 2340/06
See application file for complete search history.

(56) References Cited

U.S. PATENT DOCUMENTS

| | | | | |
|---|---|---|---|---|
| 2010/0054574 | A1* | 3/2010 | Marcelpoil ........ | G01N 15/1433 382/133 |
| 2016/0335784 | A1* | 11/2016 | Dorner ................... | H04N 1/644 |
| 2018/0025002 | A1* | 1/2018 | Dorner ...................... | G06T 7/90 382/165 |

* cited by examiner

COLOR SPACE MAPPING

FIELD

Described embodiments relate generally to color space mapping.

BACKGROUND

A digital image comprises visual elements (e.g., pixels) having various characteristics. Characteristics of visual elements can be represented numerically, such as color, intensity, or gray level. Digital images can be associated with various types, such as vector or raster type. Digital images can include photographs, such as unprocessed data captured using an image sensor of a digital camera. Digital images can be edited or manipulated in various ways. Color characteristics of digital image elements are represented using color values based on various color spaces.

SUMMARY

The following Summary is for illustrative purposes only and does not limit the scope of the technology disclosed in this document.

In an example embodiment, a method of generating modified images in a first color space is disclosed. First image data is received comprising first color information in a first color space. The first color space can be a pixel-based color space, and the first image data can comprise a digital photograph. Second image data is generated using the first image data, the second image data including converted second color information in a second color space based on the first color information. The second color space can be a pigment-based color space. Multiple color values in the second color space correlate to a same corresponding color value in the first color space. Generating the second image data may include generating supplemental color data. Generating the second image data and/or the supplemental color data can be performed using a machine learning model. The supplemental color data can include at least three channels of color data to be added to the converted second color information in an extended color space. The second image data is modified in the second color space using the converted second color information and/or the supplemental color data. A modified image is generated in the first color space using the modified second image data and the generated supplemental color data, the modified image in the first color space including modified color information in the first color space based at least in part on the supplemental color data.

In various embodiments, the method can include training the machine learning model. A training data set is generated comprising multiple color values in the first color space and corresponding color values in the second color space. The machine learning model is trained using the training dataset to generate supplemental color data and color values in the second color space based on received image data in the first color space.

In various embodiments, generating the modified image in the first color space can include determining color values by converting a color value in the second color space to a corresponding color value in the first color space and modifying the corresponding color value in the first color space based on the supplemental color data.

In an example embodiment, a non-transitory computer-readable medium is disclosed carrying instructions that, when executed by a processor and/or a computing system, cause performance of one or more methods disclosed herein.

In an example embodiment, a computing system is disclosed comprising at least one processor and at least one non-transitory computer-readable medium carrying instructions configured to cause the computing system to perform one or more methods disclosed herein.

DETAILED DESCRIPTION

Figure 1:
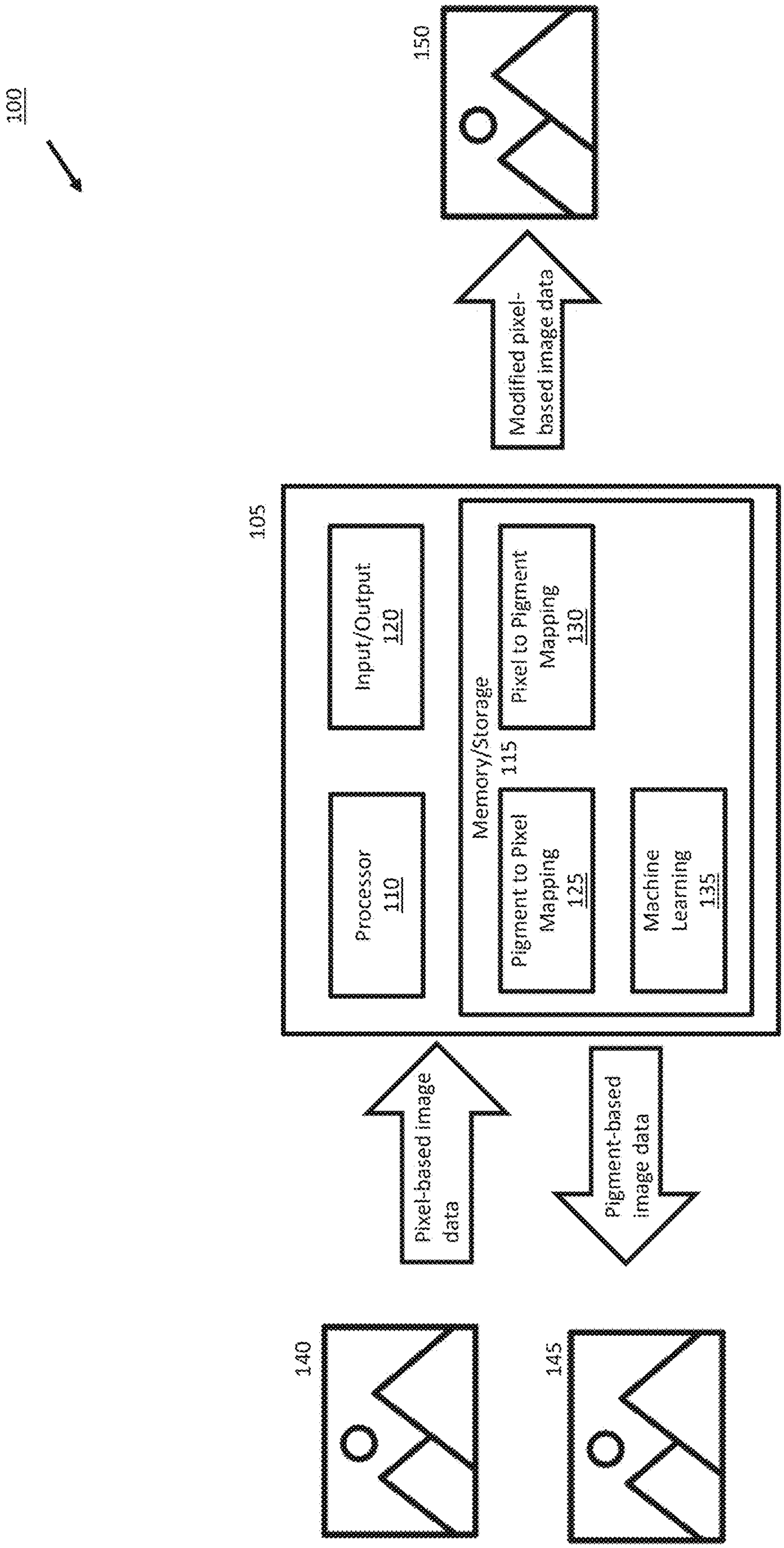
FIG. 1 is a block diagram illustrating a system flow for color space mapping.

Digital images can use different color spaces to define color values (e.g., pixel values). As used herein, a "color space" can refer to a range of possible colors represented as corresponding sets of values (e.g., numerical values). Color spaces can be pixel-based, where pixels in a two-dimensional space defining a canvas are assigned a value corresponding to a color. An example of a pixel-based color space is a color space that uses RGB values, in which colors can be defined additively based on intensities of red, green, and blue elements. HSV values (hue, saturation, value) can also be used in a similar manner. Alternatively, color spaces can be pigment-based, where color values are assigned based on pigment-like behaviors or characteristics. A pigment-based color space can define color values in a digital image based on characteristics of pigments. For example, a pigment-based color space can allow for blending of colors in a digital image in a way that simulates the behavior of physical paint (e.g., watercolor, oil, or acrylic paint). Pigment-based color spaces can be used, for example, to edit or manipulate digital images, such as for applying realistic watercolor effects, creating digital paintings, or enhancing digital photographs in ways that are not possible in a pixel-based color space. An example of a pigment-based color space is a color space that uses values based on a Kubelka-Munk model. A Kubelka-Munk model can define various colors using a non-linear combination of a set of pigments (e.g., Quinacridone magenta, Phthalo blue, Hansa yellow, and Titanium white). While a Kubelka-Munk model can provide various artistic effects or interactions, it typically does not cover the full RGB spectrum. Other pigment-based models may pose similar challenges.

Existing technologies may allow mapping from a pigment-based color space to a pixel-based color space while retaining substantially all color information (e.g., 90% or more). But mapping from a pixel-based color space to a pigment-based color space can cause problems, as a single pixel-based color value may have multiple possible corresponding values in a pigment-based color space. Existing technologies do not provide sufficient data or solutions to determine a closest corresponding value in the pigment-based color space while retaining the appearance of the image data in the pixel-based color space. Accordingly, existing technologies may not allow mapping of image data from a pixel-based color space to a pigment-based color space with acceptable accuracy (e.g., 80%, 90%, 95%, 99%, 100%). This may prevent use of pigment-based image operations in common digital images, such as digital photographs, because the effects of the pigment-based image operations are not adequately retained or accurately represented. Additionally, users may not adopt pigment-based image technologies because existing technologies do not allow for efficient and accurate mapping across color spaces.

Various embodiments include a color space mapping system that converts digital images from a pixel-based color space to a pigment-based color space ("system" or "color space mapping system") accurately or substantially accurately. Embodiments can generate supplemental color data indicating a closest pigment-based color value for a pixel-based color value. In some implementations, the system comprises a machine learning model trained to generate the supplemental color data. For example, the machine learning model can be trained using pigment-based images and corresponding pixel-based images to convert the pixel-based images from the pixel-based color space to the pigment-based color space within a threshold accuracy. The machine learning model can generate supplemental color data (e.g., additional data channels) that is used to determine a closest color value for a pixel-based element when the pixel-based element is converted to the pigment-based color space. In some embodiments, the supplemental color data comprises a residual RGB component, which can be combined with a pigment-based component (e.g., using a Kubelka-Munk model), such that the pigment-based component and the residual RGB component together provide an extended color map in which a larger spectrum of the pigment color space (e.g., all or substantially all of the pigment color space) can be mapped to the pixel-based color space to facilitate generation of pixel-based images from pigment-based images. In various embodiments, the residual component is generated together with pigment space data—that is, a model can be trained to generate complete sets of values in an extended color space, such that pixel-based image data can be translated to a pigment color space.

In an embodiment, the system generates an extended color map using the supplemental color data, which can use an extended set of color values. For example, the extended color map can define color values using four channels indicating the concentration of four main pigments in the pigment-based color space (e.g., Phthalo Blue, Quinacridone Magenta, Hansa Yellow, and Titanium White) followed by the supplemental color data comprising residual channels for values (e.g., RGB values) in the pixel-based color space (e.g., three additional values to specify values or adjustments when converting to the pixel-based color space). An illustrative set of color values in the enhanced color map can comprise [1, 0, 0, 0, 0, 0, 0], which can represent 100% blue pigment and no residual RGB colors, while [0, 0, 0, 0, 1, 0, 0] can represent 0% pigment concentration but 100% residual in the red residual channel, thus mapping to bright red in RGB. This combination of values in the enhanced color map allows for all possible RGB color values to be mapped to corresponding values in a pigment-based color space while enabling operations to be performed in the pixel-based color space. The sets of color values in the enhanced color map can be determined using a machine learning model.

The system can be used, for example, for manipulating digital photographs. A digital photograph can be generated in a pixel-based color space and converted to a pigment-based color space to allow for various effects or manipulations to be applied (e.g., to simulate behaviors of paint when manipulating the image data). After the effects or manipulations are applied, the system can convert the transformed image back to the pixel-based color space, which allows the transformed and converted image to be used like a photograph (e.g., for creating photo prints or standard digital images). Unlike existing systems, the disclosed system retains substantially all color information (e.g., 90% or more) when the image is converted from the pigment-based color space to the pixel-based color space.

Advantages of the system include allowing for richer enhancement of digital photographs. For example, disclosed embodiments can receive digital photographs in a pixel-based color space and convert them to a pigment-based color space for enhancement (e.g., using paint-like effects). The enhanced image data can then be efficiently and accurately converted back to the pixel-based color space while retaining the data generated using the pigment-based enhancements.

FIG. 1 is a block diagram illustrating a system flow 100 for color space mapping. The system flow 100 can be performed using the system 105. The system 105 comprises at least one processor 110, which can include a central processing unit (CPU), a hardware or virtual processing unit or portions thereof (e.g., one or more processor cores), or the like. The at least one processor 110 can be used to perform calculations or execute instructions to perform operations of the system 105. The system 105 further comprises one or more input/output components 120. The input/output components 120 can include, for example, a display to provide one or more interfaces provided by the system 105, to display data (e.g., images), or to receive inputs for the system 105. Additionally or alternatively, input/output components 120 can include various components for receiving inputs, such as a mouse, a keyboard, a touchscreen, a biometric sensor, a wearable device, a device for receiving gesture-based or voice inputs, or the like. In an embodiment, the input/output components 120 are used to receive pixel-based image data 140, apply modifications to the pixel-based image data (e.g., after converting to a pigment-based color space), and output modified pixel-based image data 150 based on the applied modifications. The modified pixel-based image data 150 can be based on generated pigment-based image data 145. For example, the received pixel-based image data 140 can be used to generate pigment-based image data 145, which can be modified in a pigment-based color space to apply realistic watercolor-like blending of colors, and the modified pigment-based image data 145 can be converted back to the modified pixel-based image data 150 for ease of generating photo prints or the like.

In an embodiment, the input/output components 120 can be used to provide user interfaces provided by or used by the system 105. For example, graphical user interfaces can be provided for displaying pixel-based images in the pixel-based image data 140 and corresponding pigment-based images in the pigment-based image data 145, which can be modified or unmodified. In an embodiment, a graphical user interface concurrently displays original pixel-based images in the pixel-based image data 140, corresponding pigment-based images in the pigment-based image data 145, and converted pixel-based images in the modified pixel-based image data 150 generated using a machine learning model based on the corresponding pigment-based images. This graphical user interface can be used, for example, to evaluate accuracy of the machine learning model when converting images from a pigment-based color space to a pixel-based color space. In an embodiment, a graphical user interface is provided for applying modifications to an image in a pigment-based color space and outputting a pixel-based image based on the modified image.

The system 105 further comprises one or more memory or storage components 115, which can provide modules of the system 105, the modules including a pigment to pixel mapping module 125, a pixel to pigment mapping module 130, and/or a machine learning module 135. The memory or storage components 115 can include, for example, a hardware or virtual memory, and the memory or storage components 115 can include non-transitory computer-readable media carrying instructions to perform operations of the system 105 described herein.

The system 105 receives pixel-based image data 140 comprising pixel color information in a pixel-based color space, such as a color space based on a RGB model. Using the pixel to pigment mapping module 130, the system 105 converts the pixel-based image data 140 to pigment-based image data 145 comprising pigment color information in a pigment-based color space. For example, the pixel to pigment mapping module 130 can use a machine learning model to determine corresponding pigment-based color values for a set of pixel-based color values. The generated pigment-based image data 145 can be used, for example, to apply effects or manipulations, such as for simulating characteristics of paint (e.g., for blending colors in the pigment-based image data). The effects or manipulations can be applied using the system 105, or the pigment-based image data 145 can be provided to an external system or facility where the effects or manipulations can be applied (e.g., using digital image editing software). In an embodiment, the pigment-based image data 145 can use an extended color map, which can also provide residual pixel-based image data (e.g., residual RGB data).

After the effects or manipulations are applied to the pigment-based image data 145, the pigment-based image data 145 can be converted to the pixel-based color space using the pigment to pixel mapping module 125 to generate the modified pixel-based image data 150, which accurately represents the characteristics of the pigment-based image data 145, including the applied effects or manipulations, in the pixel-based color space. The pigment to pixel mapping module 125 comprises an algorithm for converting from a pigment-based color space to a pixel-based color space, as will be appreciated by persons skilled in the art.

To accurately convert pixel-based image data 140 to the pigment-based color space, the system 105 provides the pixel to pigment mapping module 130. When converting from the pixel-based color space to the pigment-based color space, pixel color values may correspond to multiple potential pigment color values. Accordingly, the pixel to pigment mapping module 130 is configured to generate supplemental color data to indicate an appropriate (e.g., closest) pixel color value for a pigment color value. The supplemental color data can indicate an adjustment or value to be applied to a pixel color value, and the supplemental color data can comprise one or more data channels to be added to or associated with the pigment color value to facilitate the conversion from the pixel-based color space to the pigment-based color space. For example, the supplemental color data can comprise residual RGB data in an extended color map. In some embodiments, the pixel to pigment mapping module 130 determines all color values in an extended color map (e.g., comprising both pigment-based color values and residual pixel-based color values).

The system 105 provides the machine learning module 135 to train or configure one or more models comprising the pixel to pigment mapping module 130. The machine learning module 135 can receive image data comprising pixel-based images and the machine learning module 135 can train a model using randomly created or initiated pigment colors. In an embodiment, the pigment-based images are generated based on the pixel-based images (e.g., using the pixel to pigment mapping module 130). The training dataset can be used to train a model to generate pigment-based images based on pixel-based images. During training, the model can be used to generate pigment-based images based on the corresponding pixel-based images, and the results can be compared to original pigment-based images. A loss function can be calculated based on the comparison, and training the model can be based on configuring (e.g., minimizing) the loss function. In an embodiment, the conversion from the pixel-based color space to the pigment-based color space can use supplemental data in an extended color map (e.g., three additional data channels) that are added to pigment color information to indicate a corresponding pixel color value or an adjustment to a pixel color value. The model can be trained to generate the supplemental data, which allows for sufficient color information to be provided or retained for translating the pixel-based color data to pigment-based color data within a threshold accuracy. Once the model is trained by the machine learning module 135, the trained model can be stored as the pixel to pigment mapping module 130.

As used herein, a "model" can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models and/or associated techniques include, without limitation: neural networks, support vector machines, decision trees, Parzen windows, Bayes, clustering, reinforcement learning, probability distributions, decision trees, decision tree forests, and others. Models can be configured for various situations, data types, sources, and output formats. A model trained by the machine learning module 135 can include a neural network with multiple input nodes that receive training datasets. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer,") one or more nodes can produce a value classifying the input that, once the model is trained, can be used to evaluate pixel-based image data 140 (e.g., pixel color information). In some implementations, such neural networks, known as deep neural networks, can have multiple layers of intermediate nodes with different configurations, can be a combination of models that receive different parts of the input and/or input from other parts of the deep neural network, or are convolutions-partially using output from previous iterations of applying the model as further input to produce results for the current input.

A model can be trained with supervised learning (e.g., self-supervised). Testing data can then be provided to the model to assess accuracy. Testing data can be, for example, a portion of the entire dataset (e.g., 10%) held back to use for evaluation of the model. Output from the model can be compared to the desired or expected output for the training data and, based on the comparison, the model can be modified, such as by changing weights between nodes of the neural network and/or parameters of the functions used at each node in the neural network (e.g., applying a loss function). Based on the results of the model evaluation, and after applying the described modifications, the model can then be retrained to evaluate new data.

In an embodiment, a model is trained to determine residual RGB values in an extended color map based on pigment-based color values. Additionally or alternatively, a model is trained to determine values in a pigment space and corresponding residual RGB values, which allows pixel values to be accurately translated to pigment-based colors. The residual RGB values can be based on various characteristics of image data, such as color values of visual elements within a threshold distance (e.g., neighboring elements, elements within a linear distance, rates of change of visual elements).

The system 105 can be provided via a server and/or over a network (e.g., via the internet), and/or the system 105 can reside at least in part on a user device (e.g., computing device 200). In some implementations, portions of the system 105 can be provided using multiple devices. For example, a first device (e.g., a server) can provide the machine learning module 135 for training a model, and the trained model can be stored as the pixel to pigment mapping module 130 on a second device (e.g. a user device). While certain modules are illustrated as part of the system 105, more or fewer modules can be provided, and one or more modules can be combined or separated.

Figure 2:
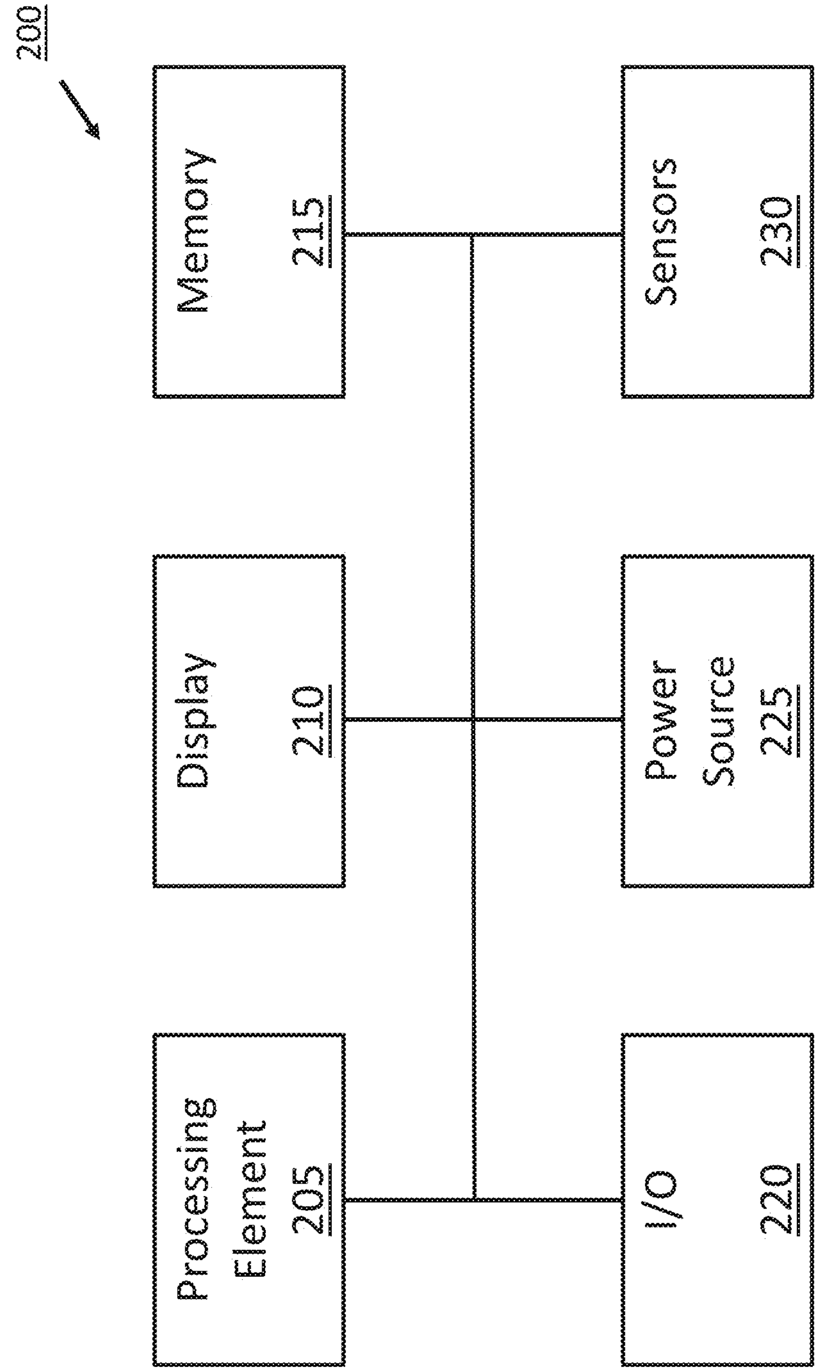
FIG. 2 is a block diagram illustrating a computing device for implementing a color space mapping system.

FIG. 2 is a block diagram illustrating a computing device 200 for implementing a color space mapping system (e.g., system 105). For example, at least a portion of the computing device 200 can comprise the system 105, or at least a portion of the system 105 can comprise the computing device 200.

The computing device 200 includes one or more processing elements 205, displays 210, memory 215, an input/output interface 220, power sources 225, and/or one or more sensors 230, each of which may be in communication either directly or indirectly.

The processing element 205 can be any type of electronic device or processor (e.g., processor 110) capable of processing, receiving, or transmitting instructions. For example, the processing element 205 can be a microprocessor or microcontroller. In some embodiments, components of the system can be controlled by a first processor and other components can be controlled by a second processor, where the first and second processors may or may not be in communication with each other. The device 200 may use one or more processing elements 205 or may utilize processing elements included in other components. For example, the device 200 can comprise a user device implementing at least a portion of the system 105, and other portions of the system may reside on a server.

The display 210 provides visual output to a user and optionally may receive user input (e.g., through a touch screen interface). The display 210 can be substantially any type of electronic display, including a liquid crystal display, organic liquid crystal display, and so on. The type and arrangement of the display depends on the desired visual information to be transmitted (e.g., can be incorporated into a wearable item such as glasses, or may be a television or large display, or a screen on a mobile device). The display 210 can be used to display pixel-based image data (e.g., 140 or 150 of FIG. 1) and pigment-based image data (e.g., 145 of FIG. 1).

The memory 215 (e.g., memory/storage 115) stores data used by the device 200 to store instructions for the processing element 205 and various data used by the system (e.g., pigment-based image data and pixel-based image data). The memory 215 can be, for example, magneto-optical storage, read only memory, random access memory, erasable programmable memory, flash memory, or a combination of one or more types of memory components. The memory 215 can include, for example, one or more non-transitory computer-readable media carrying instructions configured to cause the processing element 205 and/or the device 200 or other components of the system to perform operations described herein.

The I/O interface 220 provides communication to and from the various devices within the device 200 and components of the computing resources to one another. The I/O interface 220 can include one or more input buttons, a communication interface, such as WiFi, Ethernet, or the like, as well as other communication components, such as universal serial bus (USB) cables, or the like. In some implementations, the I/O interface 220 can be configured to receive voice inputs and/or gesture inputs.

The power source 225 provides power to the various computing resources and/or devices. The color space mapping system may include one or more power sources, and the types of power source may vary depending on the component receiving power. The power source 225 may include one or more batteries, a wall outlet, a cable cord (e.g., USB cord), or the like.

The sensors 230 may include components for providing inputs of the system, such as a camera for providing pixel-based image data. Additionally or alternatively, sensors 230 can be used to provide other inputs, such as gesture-based controls.

Components of the device 200 are illustrated only as examples, and illustrated components can be removed from or added to the device 200 without deviating from the teachings of the present disclosure. In some implementations, components of the device 200 can be included in multiple devices, such as a user device and a server.

Figure 3:
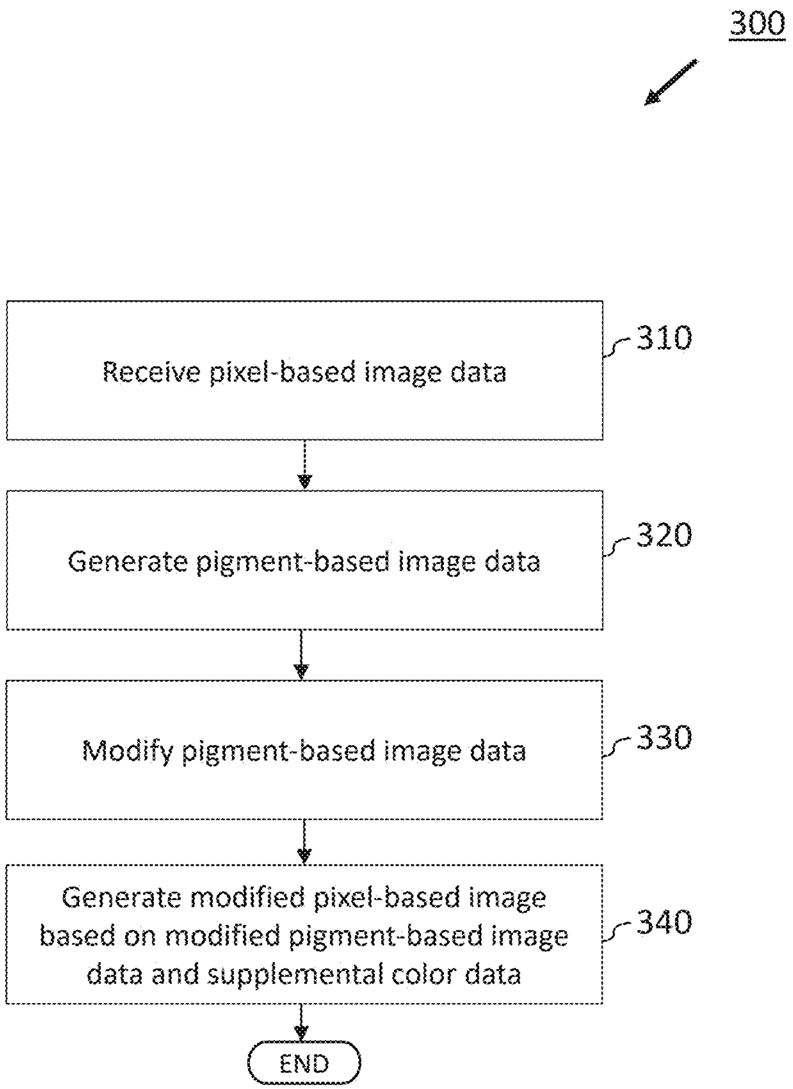
FIG. 3 is a flow diagram illustrating a process performed using a color space mapping system.

FIG. 3 is a flow diagram illustrating a process 300 performed using a color space mapping system. The process can be performed using the system 105 of FIG. 1 or the computing device 200 of FIG. 2. The process 300 can be used to convert a pixel-based image to a pigment-based color space for applying modifications to the image before converting the modified image back to a pixel-based color space. For example, the process 300 allows a digital photograph to be modified in the pigment-based color space using effects to simulate painting techniques, and the process 300 enables conversion of the modified image back to the pixel-based color space for further processing (e.g., for creating photo prints or standard digital images).

The process begins at block 310, where first image data is received comprising first color information in a first color space. The first image data can comprise pixel-based image data including pixel color information using a pixel-based color space, such as a RGB color space. For example, the first image data can be a digital photograph captured using a digital camera. The first color space can use an additive model, where colors are representing based on values of different color components (e.g., red, green, and blue).

At block 320, second image data is generated using the first image data, the second image data comprising second color information in a second color space. For example, pigment-based image data can be generated comprising pigment color information using a pigment-based color space, such as a color space using a Kubelka-Munk color model. Unlike the first color space, the second color space can simulate behaviors or characteristics of pigments, such as color blending that simulates paint characteristics. The conversion from the first color space to the second color space can use a machine learning model to determine color values in the pigment-based color space for color values in the pixel-based color space. Machine learning is used to determine the color values in the second color space because there is not a one-to-one correlation between values in the second color space and the first color space, so existing systems may lack a simple algorithmic approach for determining color values in the second color space based on color values in the first color space. As a result, existing techniques cannot be used to convert from the first color space to the second color space while retaining visual characteristics of the image (e.g., beyond a threshold accuracy).

In an embodiment, the second color space comprises an extended color space that uses color values comprising pigment-based color values and residual values representing adjustments or values of corresponding pixel-based colors.

In various embodiments, supplemental color data is generated as part of generating the second image data. The supplemental color data is generated to provide additional information for converting image data from the second color space to the first color space. In other words, because color values in the first color space may correspond to multiple potential color values in the second color space, the supplemental color data is needed to determine an appropriate (e.g., closest) color value in the first color space for a respective color value in the second color space. Some embodiments provide multiple data channels (e.g., three or more channels) of supplemental color data in an extended color map, which can be residual pixel-based color data specifying adjustments or values in a pixel-based color space. Embodiments of the color space mapping system train and provide a machine learning model to generate the supplemental color data (e.g., using the process 400 of FIG. 4) and/or color values in an extended color map.

At block 330, the second image data generated at block 320 is modified. For example, paint-like effects can be applied, such as for blending colors in a way that simulates watercolors, oils, or acrylics. The pigment-based color space allows these effects to be applied in a way that simulates behaviors or characteristics of pigments. The modifications applied at block 330 can be performed using the color space mapping system or using an external system or application (e.g., illustration or image editing software).

At block 340, a modified image using the first color space is generated based on the modified second image data. For example, a modified pixel-based image can be generated based on a modified pigment-based image and corresponding supplemental color data generated. The supplemental color data is used to determine the appropriate (e.g., closest or best match) color value in the first color space for a color value in the second color space. Color values in the first color space can be determined using an extended color map. The modified image generated at block 340 retains characteristics of the modified pigment-based image data generated at block 330, while also having the advantages of the first color space. For example, where the first color space is a pixel-based color space, the modified image generated at block 340 can be used in the same manner as other pixel-based images (e.g., photographs), such as to create photo prints, to generate standard digital images (e.g., for display or use in software applications), to create physical merchandise, and so forth.

Figure 4:
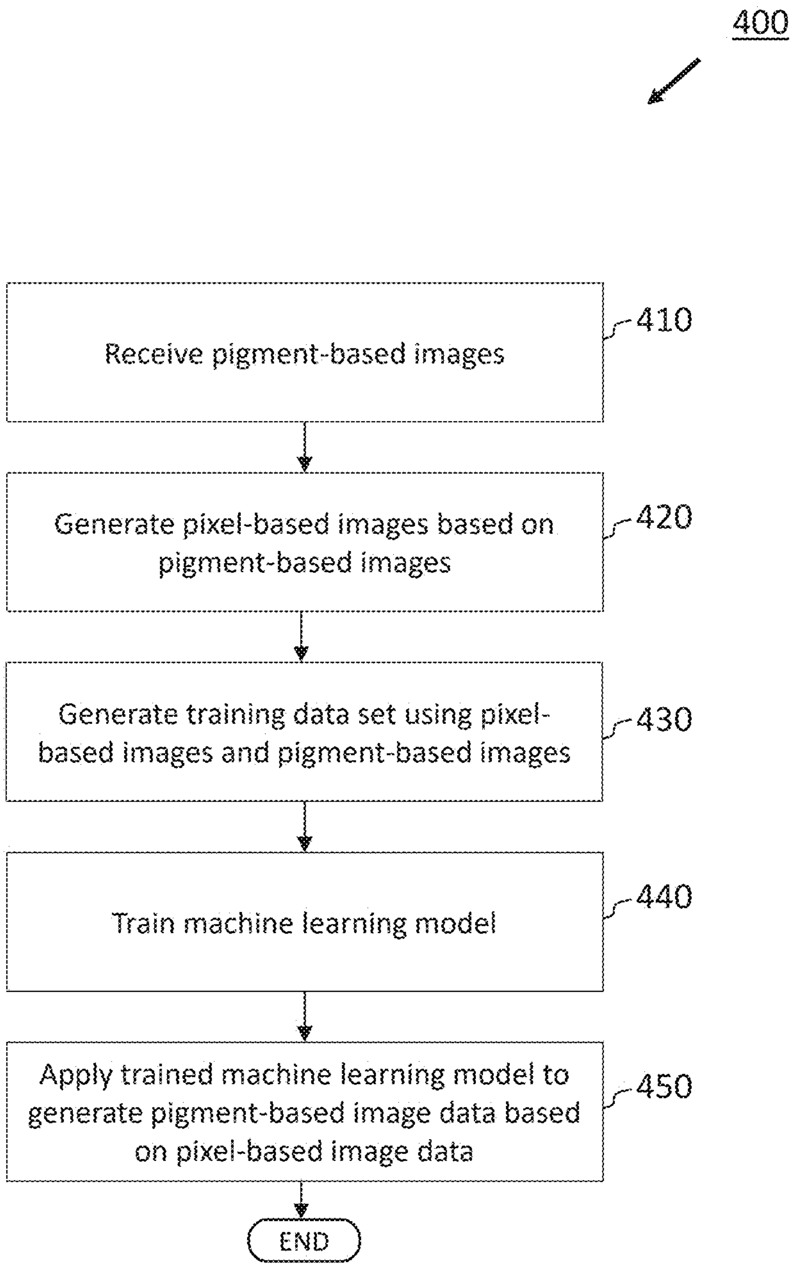
FIG. 4 is a flow diagram illustrating a process performed using a color space mapping system.

FIG. 4 is a flow diagram illustrating a process 400 performed using a color space mapping system. The process 400 can be performed using the system 105 of FIG. 1 or the computing device 200 of FIG. 2. The process 400 can be performed to train a machine learning model to convert pixel-based images in a pixel-based color space to pigment-based images in a pigment-based color space. In some embodiments, the machine learning model is trained to generate supplemental color data that is combined with pigment-based color information to determine color values in a pixel-based color space. In some embodiments, the machine learning model is trained to generate at least a portion of color values using an extended color map.

The process 400 begins at block 410, where pigment-based images are received. The pigment-based images comprise pigment color information in a pigment color space, such as a color space using a Kubelka-Munk color model.

At block 420, pixel-based images are generated based on the pigment-based images received at block 410. For example, an algorithm can be used to determine color values in the pixel-based color space based on corresponding color values in the pigment-based color space, and the determined color values can be used to generate the pixel-based images. In some implementations, both pixel-based images and corresponding pigment-based images are received (e.g., at block 410), and there is no need to generate the pixel-based images. In some embodiments, the pixel-based color space uses an extended color map comprising pigment-based color values and residual pixel-based data (e.g., color values or adjustments to color values).

At block 430, a training dataset is generated using the pigment-based images and the pixel-based images. In some embodiments, generating the training dataset can comprise identifying characteristics of the pigment-based images and the pixel-based images, such as determining correlations between pigment-based images and respective pixel-based images, determining color values (e.g., pixel colors, pigment colors), determining variable values, or the like.

At block 440, a machine learning model is trained using the training dataset to generate pigment-based images based on pixel-based images. For example, the pigment-based images received at block 410 can be used as a ground truth, and the pixel-based images generated or received at block 420 can be converted using the machine learning model to converted pigment-based images for comparison to the ground truth. A loss function can be calculated based on the comparison, and weights or other parameters associated with the machine learning model can be adjusted. In some embodiments, the machine learning model is trained to generate at least some color values based on an extended color map, which can be used to generate the pigment-based images.

In some implementations, the machine learning model can generate supplemental color data for converting the pixel-based images to the pigment-based images, such as three data channels in an extended color map to indicate color values or adjustments to color values when converting from the pixel-based color space to the pigment-based color space. In some implementations, values of the supplemental color data can be initialized to arbitrary values, average values, minimum values, maximum values, or the like, and the values of the supplemental color data can be configured (e.g., optimized) through the training of the machine learning model. As discussed herein, a color value in the pixel-based color space may correspond to multiple potential color values in the pigment-based color space. Supplemental color data generated by the machine learning model is used to determine an appropriate color value in a the pigment-based color space based on the color value in the pixel-based color space, such as a color value that is optimized or that matches within a threshold accuracy (e.g., 80%, 90%, 95%, 99%).

At block 450, the trained machine learning model can be applied to pixel-based image data to generate pigment-based image data. For example, application of the machine learning model can include performing one or more operations of the process 300 of FIG. 3. In an embodiment, the pixel-based image data is converted to pigment-based image data (e.g., from a photograph), and modifications are applied to the pigment-based image data before converting back to a pixel-based color space. In some embodiments, the pigment-based image data includes, or is used to generate, supplemental data comprising residual pixel-based color data (e.g., generated using the trained machine learning model). Using the trained machine learning model, the system determines pixel color values for the pigment color values in the pigment-based image data, and the system generates modified pixel-based image data based on the pixel color values. The modified pixel-based image data generated at block 450 can be used, for example, to output (e.g., on a display) a pixel-based image that retains characteristics (e.g., appearance, color data) of the pigment-based image data.

In alternative embodiments, a model can be trained based on randomly calculated pigment values using two parallel processes. For example, in a first process, first and second pigment values are transformed to corresponding pixel values algorithmically. The pigment values can then be summed in a pigment space, and the sum can also be transformed to a corresponding pixel value to generate a predicted result. The predicted result represents mixing of the two randomly calculated pigment values.

In a second process performed in parallel with the first process, the first and second pigment values are summed in the pigment space, and the sum is transformed to a corresponding pixel value algorithmically to generate a ground truth result. The ground truth result can be compared to the predicted result to determine a loss function, and the model is trained based on the loss function (e.g., to minimize the loss function). In some implementations, the process 400 includes generating a testing dataset and testing the trained machine learning model. For example, a portion of the training dataset generated at block 430 can be held back as testing data, and the trained machine learning model can be applied to the testing data to assess accuracy. Outputs of the trained machine learning model can be compared to pigment-based images in the testing dataset, and it can be determined whether the trained machine learning model exceeds the threshold accuracy. When the trained machine learning model does not exceed the threshold accuracy, the model can be retrained. Retraining the machine learning model can comprising repeating at least a portion of the process 400 using the same training dataset or a different (e.g., expanded) training dataset, and/or adjusting weights or other parameters of the machine learning model.

In some implementations, operations of the processes 300 and 400 can be combined, repeated, and/or performed in parallel. Additionally, operations can be added to or removed from the processes 300 and 400 while maintaining a similar functionality. In some implementations, one or more operations of the processes 300 and/or 400 can be performed in real time (e.g., in seconds or less), such as for quickly converting pixel-based images (e.g., photos) to a pigment-based color space and/or quickly converting modified pigment-based images from the pigment-based color space to the pixel-based color space.

Disclosed embodiments advantageously allow digital images to be converted to different color spaces, which may not have a one-to-one mapping, while retaining color data. While examples are described herein related to translating images from a pixel-based color space to a pigment-based color space, disclosed embodiments can be applied to other color spaces as well. While examples are described herein related to digital photographs, disclosed embodiments can be applied to other kinds of images. Embodiments described herein should not be interpreted as mutually exclusive, and disclosed embodiments can be combined in various ways.

The technology described herein can be implemented as logical operations and/or modules in one or more systems. The logical operations can be implemented as a sequence of processor-implemented steps executing in one or more computer systems and as interconnected machine or circuit modules within one or more computer systems. Likewise, the descriptions of various component modules can be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations can be performed in any order, unless explicitly claimed otherwise or unless a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology can be employed in special-purpose devices independent of a personal computer.

The above specification, examples, and data provide a complete description of the structure and use of example embodiments as defined in the claims. Although various example embodiments are described above, other embodiments using different combinations of elements and structures disclosed herein are contemplated, as other implementations can be determined through ordinary skill based upon the teachings of the present disclosure. It is intended that all matter contained in the above description and shown in the accompanying drawings shall be interpreted as illustrative only of particular embodiments and not limiting. Changes in detail or structure can be made without departing from the basic elements as defined in the following claims.

What is claimed is:

1. A computer-implemented method of color space mapping, the method comprising:

receiving pixel-based image data for a first digital image comprising pixel color information in a pixel-based color space;

generating, using the pixel-based image data, pigment-based image data, wherein the pigment-based image data comprises converted pigment color information in a pigment-based color space in a digital environment based on the pixel color information, wherein generating the pigment-based image data includes generating supplemental color data;

modifying the pigment-based image data in the pigment-based color space using at least the converted pigment color information for the first digital image; and generating a modified pixel-based image using the modified pigment-based image data and the supplemental color data, wherein the modified pixel-based image is a second digital image and comprises modified color information in the pixel-based color space based at least in part on the supplemental color data.

2. The computer-implemented method of claim 1, wherein the pigment-based image data and the supplemental color data are generated using a machine learning model.

3. The computer-implemented method of claim 1, wherein the pixel-based color space uses a red-green-blue color model.

4. The computer-implemented method of claim 1, wherein the pigment-based color space uses a Kubelka-Munk color model.

5. The computer-implemented method of claim 1, wherein the supplemental color data comprises at least three channels of color data to be added to the converted pigment color information in an extended color space.

6. The computer-implemented method of claim 1, wherein generating the modified pixel-based image comprises determining pixel values by:

converting a color value in the pigment-based color space to a corresponding pixel color value in the pixel-based color space; and modifying the corresponding pixel color value in the pixel-based color space based on the supplemental color data.

7. A computer-implemented method of color space mapping, the method comprising:

generating a training data set comprising multiple pixel-based color values and corresponding pigment-based color values;

training, using the training data set, a machine learning model to generate supplemental color data and pigment-based color values based on pixel-based image data;

receiving pixel-based image data comprising pixel color information in a pixel-based color space;

generating, using the trained machine learning model, the supplemental color data and the pigment-based image data based on the received pixel-based image data, wherein the pigment-based image data comprises converted pigment color information in a pigment-based color space based on the pixel color information;

modifying the pigment-based image data in the pigment-based color space using at least the converted pigment color information; and generating a modified pixel-based image using the modified pigment-based image data and the supplemental color data, wherein the modified pixel-based image comprises modified color information in the pixel-based color space based at least in part on the supplemental color data.

8. A non-transitory computer-readable medium carrying instructions that, when executed by a processor, cause the processor to perform operations comprising:

receive first image data comprising first color information in a first color space;

generate, using the first image data, second image data, wherein the second image data comprises converted second color information in a second color space based on the first color information, wherein multiple color values in the second color space correlate to a same corresponding color value in the first color space, and wherein generating the second image data includes generating supplemental color data, wherein the second image data and the supplemental color data are generated using a machine learned model;

modify the second image data in the second color space using at least the converted second color information; and generate a modified image in the first color space using the modified second image data and the supplemental color data, wherein the modified image in the first color space comprises modified color information in the first color space based at least in part on the supplemental color data.

9. The non-transitory computer-readable medium of claim 8, wherein the received first image data comprises a digital image.

10. The non-transitory computer-readable medium of claim 8, wherein the first color space is a pixel-based color space.

11. The non-transitory computer-readable medium of claim 8, wherein the second color space is a pigment-based color space.

12. The non-transitory computer-readable medium of claim 8, wherein the supplemental color data comprises at least three channels of color data to be added to the converted second color information in an extended color space.

13. The non-transitory computer-readable medium of claim 8, wherein the processor is further configured to perform operations comprising:

generate a training data set comprising multiple color values in the first color space and corresponding color values in the second color space; and train, using the training data set, the machine learning model to generate supplemental color data in the second color space based on received image data in the first color space.

14. The non-transitory computer-readable medium of claim 8, wherein generating the modified image in the first color space comprises determining color values by:

converting a color value in the second color space to a corresponding color value in the first color space; and modifying the corresponding color value in the first color space based on the supplemental color data.

15. A computing system, comprising:

at least one processor; and at least one non-transitory memory carrying instructions that, when executed by the at least one processor, cause the computing system to perform operations comprising:

receive first image data comprising first color information in a first color space, wherein the first image data comprises a digital photograph;

generate, using the first image data, second image data, wherein the second image data comprises converted second color information in a second color space based on the first color information, wherein multiple color values in the second color space correlate to a same corresponding color value in the first color space, and wherein generating the second image data includes generating supplemental color data;

modify the second image data in the second color space using at least the converted second color information; and generate a modified image in the first color space using the modified second image data and the supplemental color data, wherein the modified image in the first color space comprises modified color information in the first color space based at least in part on the supplemental color data.

16. The computing system of claim 15, wherein the second image data and the supplemental color data are generated using a machine learning model.

17. The computing system of claim 15, wherein the first color space is a pixel-based color space.

* * * * *